W. W. WHITCOMB.
FRICTION DEVICE.
APPLICATION FILED JULY 11, 1913.
1,082,834.
Patented Dec. 30, 1913.
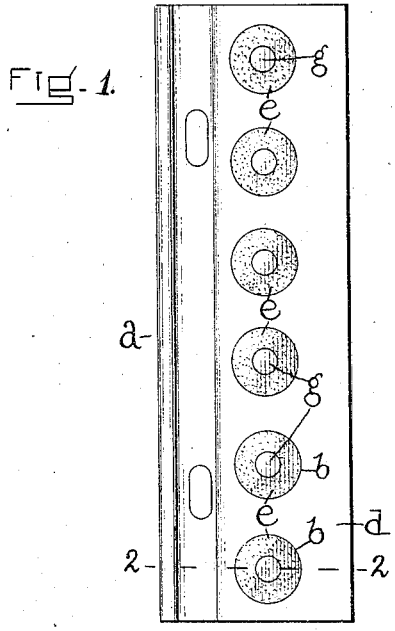
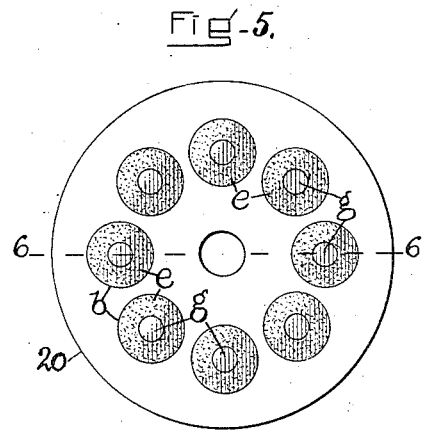
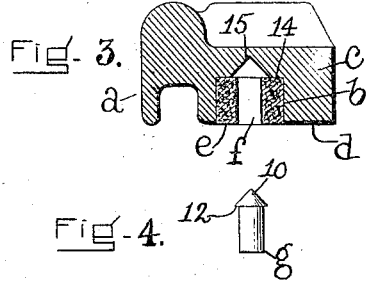
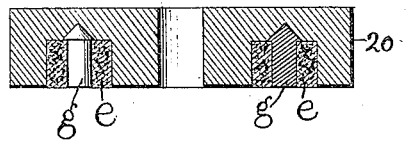
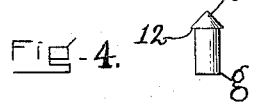
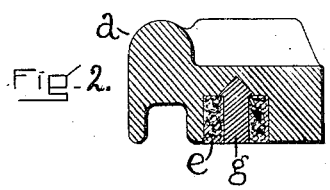
WITNESSES:
John Buckler
J. Murphy
INVENTOR:
William Wirt Whitcomb
by Jas. H. Churchill
atty.

UNITED STATES PATENT OFFICE.

WILLIAM WIRT WHITCOMB, OF BROOKLINE, MASSACHUSETTS.

FRICTION DEVICE.

1,082,834.

Specification of Letters Patent. Patented Dec. 30, 1913.

Application filed July 11, 1913. Serial No. 778,473.

*To all whom it may concern:*

Be it known that I, WILLIAM WIRT WHITCOMB, a citizen of the United States, residing in Brookline, county of Norfolk, and State of Massachusetts, have invented an Improvement in Friction Devices, of which the following description, in connection with the accompanying drawings, is a specification, like characters on the drawings representing like parts.

This invention relates to a friction device and is herein shown as a brake-shoe or clutching member.

The invention has for its object to provide a friction device of maximum durability and braking or clutching efficiency at a minimum cost, and one which is especially adapted for use in places where it is subjected to severe usage, as, for instance, on railway cars. To this end, the friction device is provided with preferably a plurality of sockets, in which are placed hollow or tubular gripping members of resilient material, preferably cork in its natural state, and which are retained in said sockets by means of center plugs of relatively rigid or harder material, which fill the center bore of the gripping members and force or expand the same outwardly into firm contact with the walls of the said sockets. The expanding plugs may be of metallic material, such as steel, or they may be of non-metallic material of sufficient rigidity or hardness, such as porcelain, wood or like material, and said plugs have their outer surface substantially flush with the outer surface of the friction member and of the resilient gripping members, so as to confine the gripping member between the rigid or hard wearing surfaces, whereby the gripping member is maintained in its most effective condition with its outer or contacting surface protected against disintegration, tearing or rupture under conditions of severe usage. These and other features of this invention will be pointed out in the claims at the end of this specification.

Figure 1 represents in elevation one form of brake-shoe embodying this invention. Fig. 2, a section on the line 2—2, Fig. 1. Fig. 3, a section of the shoe shown in Fig. 1 with the plug member removed. Fig. 4, a detail of one form of plug member. Fig. 5, an elevation of one form of clutch member embodying the invention, and Fig. 6, a section on the line 6—6, Fig. 5.

Referring to the drawings, $a$ represents a friction device in the form of a brake shoe, such as is now commonly employed on steam railroads. The brake shoe $a$ is provided with a plurality of sockets $b$ in its body portion $c$, which extends rearwardly from the front or contacting face $d$ thereof, and which receive within them gripping members $e$ of resilient material, preferably cork in its natural state. The gripping members $e$ are provided with a central bore or opening $f$ for the reception of center plugs or expanding members $g$, which are of relatively rigid or hard material, such as steel, porcelain, wood or the like. In the present instance, the plug member $g$ is shown separate from the brake-shoe or friction device $a$ and is provided at its inner end with a conical head 10, which forms an annular shoulder 12, and the socket $b$ in the brake-shoe is provided with a bottom wall 14 and with a central concavity 15.

The tubular cork member $e$ is inserted freely into the socket $b$ and rests against the bottom 14 thereof and the plug member $g$, which is made of larger diameter than the bore $f$ of the cork member, is then forced through said bore until the head 10 passes into the concavity 15 and the outer end of the plug member is flush or substantially flush with the outer or contacting face $d$ of the brake-shoe, as represented in Fig. 2. When the plug member $g$ is forced into the bore of the cork member $e$, it expands the latter from within the same and forces the outer surface into firm contact with the walls of the socket and further compresses the cork between two rigid or hard wearing surfaces, with the result that the cork is firmly held under compression in its socket and the outer surface of the cork is protected from a tearing or disintegrating action when the shoe is engaged with the revolving body with which it coöperates. In this manner, the life of the cork member is materially prolonged and the efficiency of the brake-shoe especially for railway service is greatly increased. Furthermore, the diameter of the sockets and of the cork members may be greatly increased, and a greater area of cork gripping surface obtained at less cost, than can be obtained with solid corks, as in practice it has been demonstrated that when solid corks are used, the best results are obtained with corks inserted into sockets three-quarters of an inch in diameter, whereas in the present case, the sockets can be made as large as one and one-half inches in diameter and the corks provided with a center bore of one-half inch, and the plug member a diameter of seven-eighths of an inch. In this case, the area of the gripping member is materially increased, while at the same time, it is protected and preserved in its most efficient condition by the wearing surfaces between which it is confined.

While the invention is especially applicable to a brake-shoe for railway uses, it is not desired to limit the invention in this respect, as the invention may be embodied in other forms of friction devices, and in the present instance, I have illustrated it in Figs. 5 and 6, as embodied in a clutch member in the form of a disk 20.

In the present instance, I have shown one form of plug member, which is separate from the body portion of the socket member, but it may be integral therewith, and suitably shaped to effect the expansion of the cork, when the latter is forced into its socket.

Claims:

1. A friction device of the character described, comprising a body portion provided with a socket, a gripping member of resilient material located in said socket and provided with a bore whose walls are normally separated, and a plug member of larger diameter than said bore and extended into the latter to enlarge the said bore and expand the said gripping member and form a wearing surface within the latter, substantially as described.

2. A friction device of the character described, comprising a body portion provided with a socket, a gripping member of cork located in said socket with its outer surface substantially flush with the surface of said body portion and provided with a substantially central bore whose walls are normally separated, and a plug member of rigid material of larger diameter than said bore and extended into the latter to enlarge the said bore and with its outer surface substantially flush with the outer surface of said gripping member, substantially as described.

3. A friction device of the character described, comprising a body portion provided with a socket, a gripping member of resilient material located in said socket and having an opening whose walls are normally separated, and a plug member located in said socket with its outer surface substantially flush with the outer surface of said gripping member and extended into the opening in the latter to enlarge said opening and force the gripping member into firm engagement with the said body portion, substantially as described.

In testimony whereof, I have signed my name to this specification in the presence of two subscribing witnesses.

WILLIAM WIRT WHITCOMB.

Witnesses:
 Jas. H. Churchill,
 J. Murphy.